United States Patent [19]

Spencer et al.

[11] Patent Number: 4,613,877

[45] Date of Patent: Sep. 23, 1986

[54] HIGH RESOLUTION LASER PRINTER

[75] Inventors: David R. Spencer, Melville; Amnon Goldstein, Pelham, both of N.Y.; David Grey, Lexington, Mass.; Theodore G. Balchunas, Huntington Station; Arthur B. Kaplan, Merrick, both of N.Y.

[73] Assignee: Data Recording Systems, Inc., Melville, N.Y.

[21] Appl. No.: 674,622

[22] Filed: Nov. 26, 1984

[51] Int. Cl.⁴ ............................................. G01D 15/14
[52] U.S. Cl. ................................. 346/160; 346/108; 358/293; 350/6.8; 354/4
[58] Field of Search ............. 346/160, 107, 108, 76 L; 358/285, 293, 302; 350/6.7–6.8; 364/519; 354/4, 10

[56] References Cited

U.S. PATENT DOCUMENTS 4,270,131  5/1981  Tompkins et al. ................... 358/302
4,410,234 10/1983  Mikami et al. ....................... 350/6.8

FOREIGN PATENT DOCUMENTS 0119239  9/1979  Japan ..................................... 350/6.8

*Primary Examiner*—A. Evans
*Attorney, Agent, or Firm*—Darby & Darby

[57] ABSTRACT

A high resolution laser printer utilizes a first cylindrical lens to focus a laser beam in the sagittal direction prior to the facets of a rotating polygon. The light reflected from the polygon is focused in the horizontal direction at the photoconductor drum of an electrophotographic process by a scan lens assembly. Following the scan lens assembly, there is a second cylindrical lens which also focuses the laser beam in the horizontal direction at the photoconductor. The first and second cylindrical lenses are positioned to eliminate errors in the facets of the polygon. Scan velocity deviations resulting from the optical design are corrected by storing correction information in a memory and using this information to vary the rate at which the laser is modulated with data.

10 Claims, 12 Drawing Figures

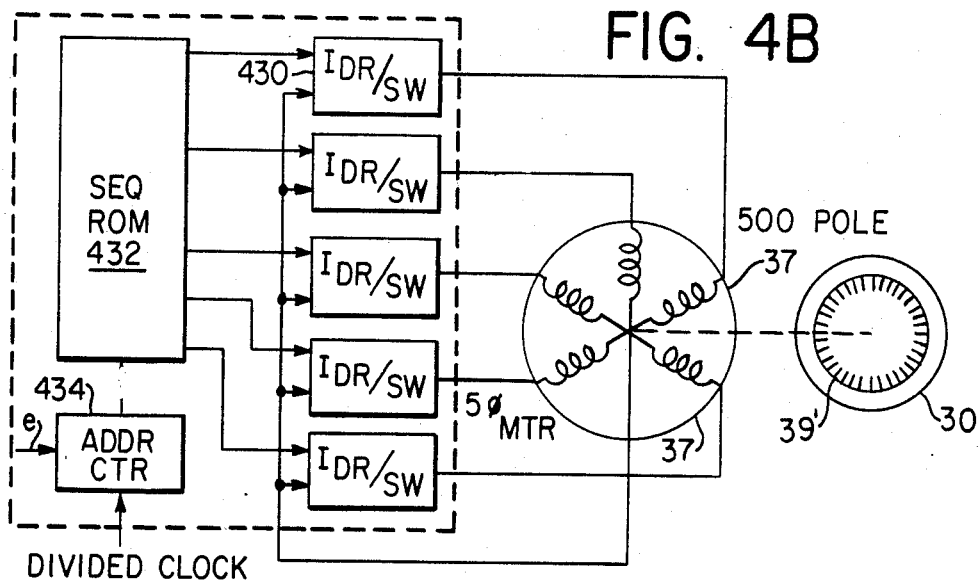
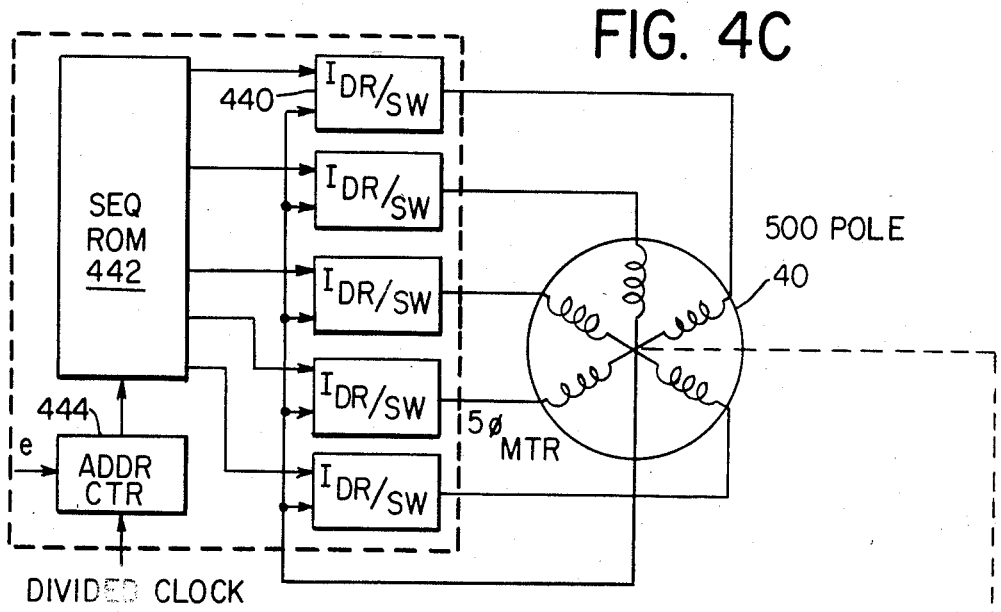
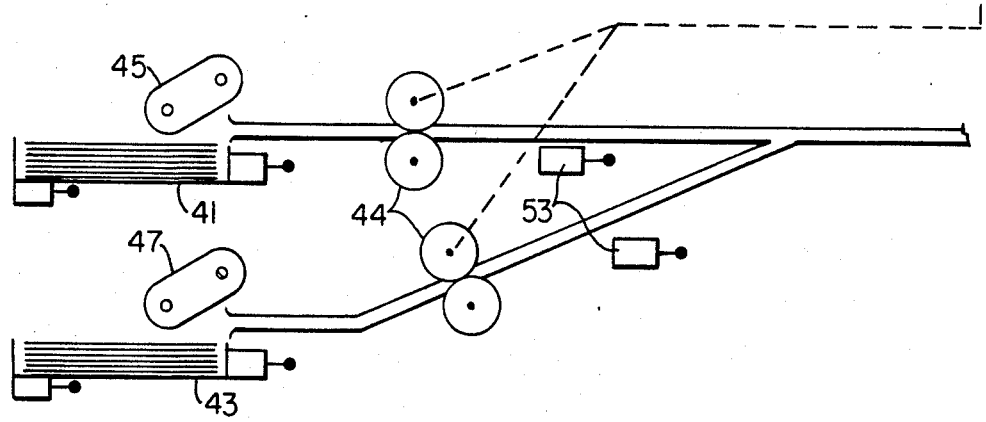

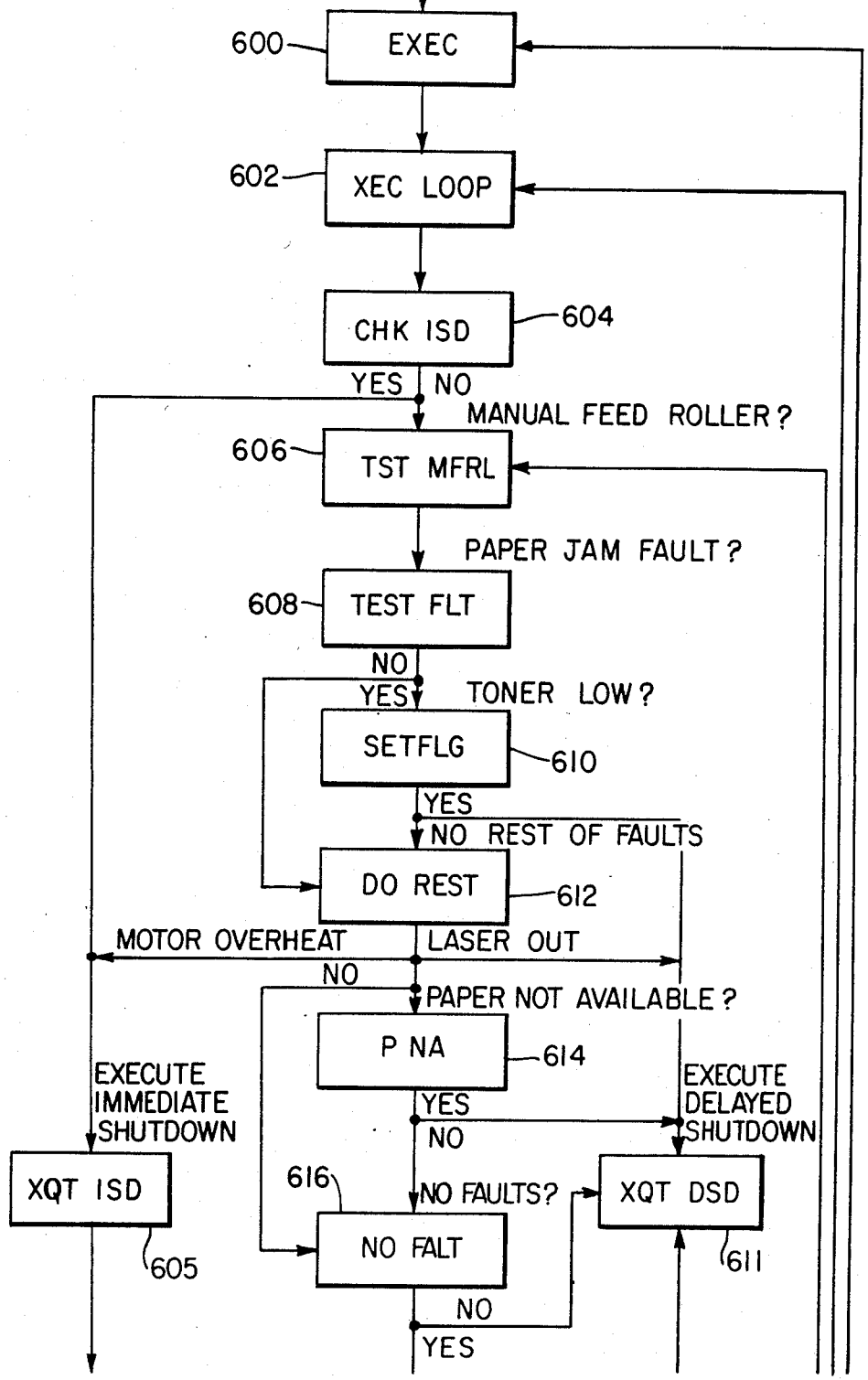

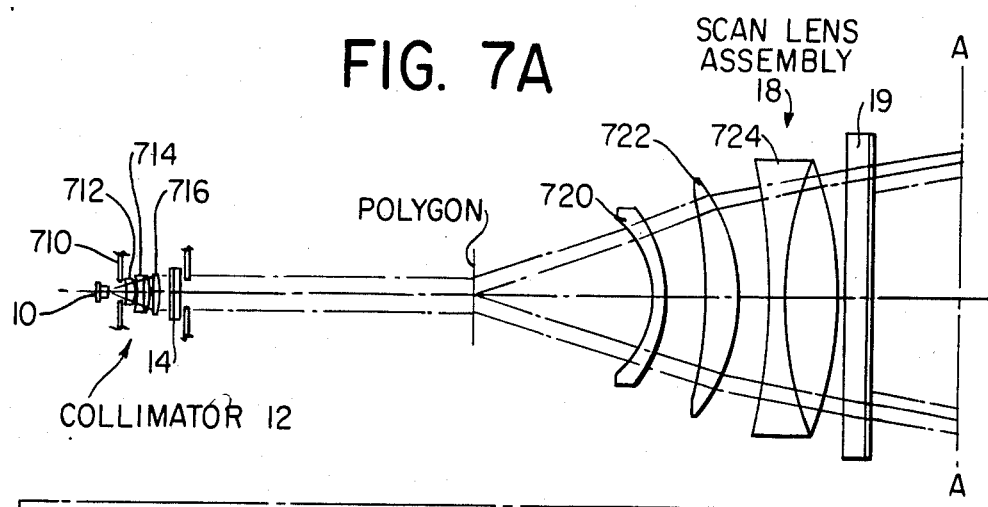
FIG. 7A
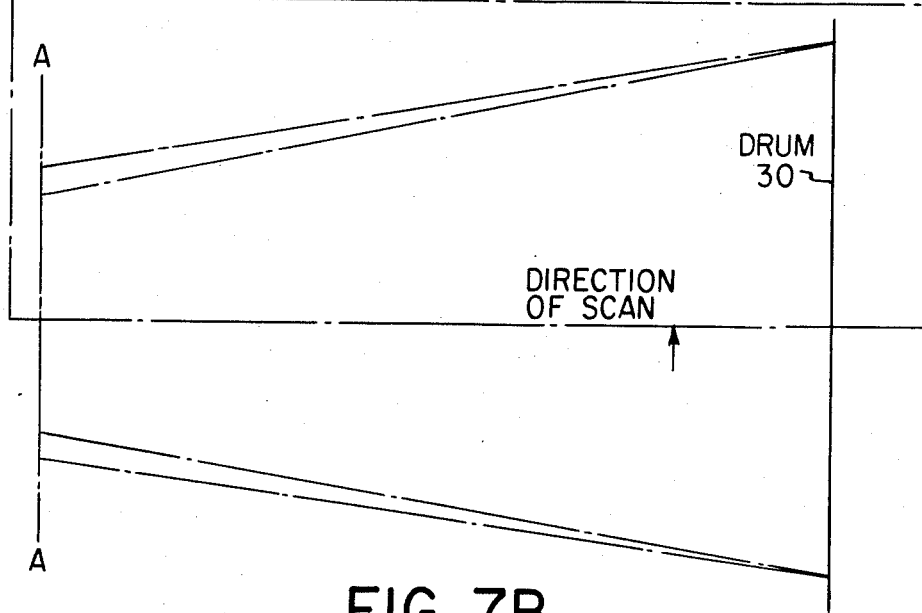
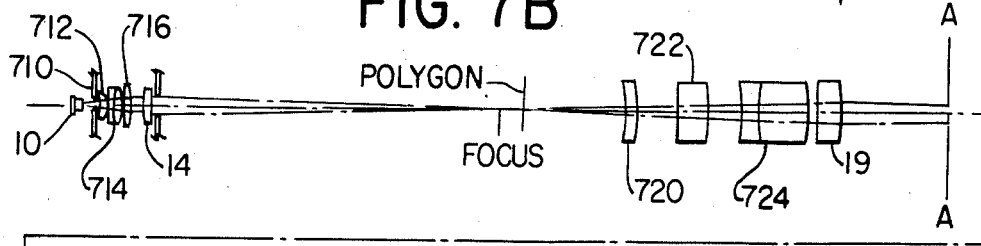
FIG. 7B
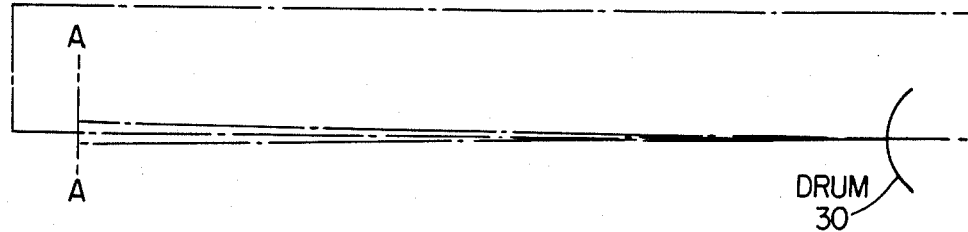

HIGH RESOLUTION LASER PRINTER

BACKGROUND OF THE INVENTION

This invention relates to laser printers and, more particularly, to high resolution or typographical quality laser printers.

In recent years, laser printers have been utilized in increasing numbers as a means for producing hard copy from a computer, computer generated video or video source. The more advanced of these laser printers produce the hard copy with good resolution in a relatively short period of time.

Basically, a laser printer uses an optical lens system to focus the light beam output of a laser to a spot on a photosensitive surface. The spot is caused to sweep across the surface in a raster fashion by a rotating or oscillating mirror. Computer or video raster information modulates the light beam as the photosensitive surface moves in a direction perpendicular to and under the sweeping light beam. If the photosensitive surface is the photoconductor drum in an electrophotographic process, the sweeping and modulated light beam causes the formation of an electrostatic charge image on the drum. This image can then be developed, transferred to paper and fused with the paper in a manner typical of electrophotographic copiers. An example of such a laser printer is disclosed in U.S. Pat. No. 3,867,571 of Starkweather, et al.

Laser printers typically have resolutions of about 240 dots/inch and most have resolutions under 400 dots/inch. Thus, they are generally limited to computer data output and general office use. In the printing and publishing industries, resolutions in excess of 500 dots/inch are used. To achieve this resolution, electronic phototypesetters are generally used. An example of these devices is the Monotype Lasercomp manufactured by Monotype Corporation, Ltd. of Salfords, Redhill, England. Such phototypesetters use focused light, e.g. from a laser beam, to expose a photographic film medium and generally function like the system described in U.S. Pat. No. 4,257,053 of Gilbreath.

The difficulty with the electronic phototypsetters that expose film is that they are relatively slow, film is relatively expensive (well over 12 times the cost of paper and toner) and generally requires inconvenient, time-consuming chemical development.

There is a need in the publishing and printing industry for a device with the time, cost and convenience benefits of a laser printer and with sufficient resolution that it can be used to produce: (1) typographic page proofs of the image information which is intended to produce a copy or master from a phototypesetter; (2) direct output of typographic quality documents, i.e. demand printing; and (3) typographic quality masters for volume duplication. In order to achieve this, the resolution of laser printers must be significantly increased, without substantial sacrifice in the cost of the system.

If a high resoution is achieved, it can be lost due to variations in the corona charge placed on the photoconductor as a result of environmental factors. It is proposed in U.S. Pat. No. 3,604,925 of Snelling to correct for this by sensing the corona current via a wire located across the photoconductor drum and to use this signal to control the corona voltage to keep the sensed current constant. This is a relatively sensitive arrangement, however, and it increases the cost of the system because of the need for the sensing wire and its support structure.

SUMMARY OF THE INVENTION

The present invention is directed to the development of low cost laser printers that can be switched between at least one high resolution/moderate speed mode and another low resolution/high speed mode. The high resolution is achieved by an optical system that keeps the laser light spot in focus as it sweeps across a photoconductor medium, despite errors in a rotating polygon that creates the sweep of the beam. In addition, electronic circuit means are provided for correcting scan velocity errors without the use of expensive optics. In order to prevent a loss of resolution in the electrophotographic process, the motion of the photoconductor medium and the hard copy paper are accurately positioned through the use of precision stepper motors which are driven by a system clock that also synchronizes the video data rate. Further the change in mode can be made quickly without having to wait for the rotating polygon to change speed, by keeping its speed constant and changing the number of facets used. Thus a change to a lower resolution mode is achieved under control from the program of a microprocessor by changing (1) the speed of the stepper motors, (2) the heat of the fuser and corona current in the electrophotographic process, (3) the laser output power and (4) the number of facets of the rotating polygon that are used.

In an illustrative embodiment of the invention, the output of a video modulated solid state laser is turned into a scanning spot on a photoconductor drum of an electrophotographic process via an optical system that includes a rotating polygon. The laser beam is directed through a collimator so that its rays are parallel. This collimated beam is then passed through a first cylindrical lens that focuses the beam in the vertical or cross-scan direction just prior to the facets of the rotating polygon. Due to the moving facets of the polygon, the beam is caused to sweep across the input of a scan lens assembly. In the high resolution mode, every other facet is used for scanning so as to maintain synchronism between the specific input data rate and the printing rate. In the low resolution mode the system microprocessor causes every facet to be used to provide the appropriate system data rates. Thus the polygon speed is kept the same in both modes.

Regardless of the mode, i.e. high or low resolution, the scan lens assembly focuses the beam in the horizontal or scan direction along a straight line coincident with the photoconductor, i.e. it produces horizontal focusing and field flattening. Also, a second cylindrical lens after the scan lens assembly, in conjunction with the scan lens assembly, refocuses the beam in the vertical or cross-scan direction.

By placing the first and second cylindrical lenses and scan lens on the same optical center, tolerances in the manufacture of the polygon can be reduced. Therefore, the polygon can be made with less strict tolerances and, consequently, at a lower cost, without degrading the system resolution.

Because the scan lens assembly acts as a field flattener, it introduces a scan velocity error, i.e. the speed at which the focused spot sweeps across the photoconductor varies. This could be corrected with further optical elements, but it has been found that it is more economical to correct this electronically. In accomplishing this, the video raster data for one line is stored. It is then read out and used to modulate the laser when a "start-of-scan" photodetector indicates that the laser is about to sweep across the photoconductor drum. The clock signal for reading the data from memory, however, is varied in an analog sinusoidal manner that is opposite to the scan velocity error. This analog variation is stored in a read-only memory and the result is to match the data read out to the laser with the spot sweep speed so as to eliminate the scan speed error introduced by the design of the field flattening lens.

High resolution requires not only an accurately sweeping focused spot, it requires accurate movement of the photoconductor drum upon which the spot writes to form an electrostatic image and the accurate movement of the paper onto which the developed image is transferred. This is accomplished by rotating the photoconductor drum and the paper feed mechanism via stepper motors having several hundred poles. The signal for these stepper motors is derived from a system clock which also drives the polygon and controls the readout of data to the laser. In addition, an encoder is located on the photoconductor drum so that its position may be known within a few degrees of rotation. The system control microprocessor uses the drum position information along with the other system parameters to control the entire system and to maintain resolution in the vertical or drum movement direction.

When the laser printer system has been adjusted for high resolution, it is still possible for there to be a degradation in system performance due to environmental change. In particular, changes in humidity, atmospheric pressure and dust accumulation can affect the electrostatic charge placed on the photoconductor by the corona charging unit. This occurs because ion production at a particular voltage may vary when environmental conditions change. To compensate for this, a constant current source is used to operate the corona, thereby assuring a relatively constant supply of charging ions. This source merely assures that its output is constant and does not depend on sensing corona current via an additional detection wire located under the corona generating unit.

BRIEF DESCRIPTION OF THE DRAWINGS

The foregoing and other features of the present invention will be more readily apparent from the following detailed description and drawings of an illustrative embodiment of the invention in which:

FIGS. 4A, 4B and 4C are schematic diagrams of the circuits for driving the polygon, photoconductor drum, and paper feed motors, respectively;

FIGS. 6A and 6B are a flow chart for the microprocessor of FIG. 5; and

FIGS. 7A and 7B are schematic drawings of the optics of the present invention in the scan direction and sagittal direction, respectively.

DESCRIPTION OF AN ILLUSTRATIVE EMBODIMENT

Figure 1:
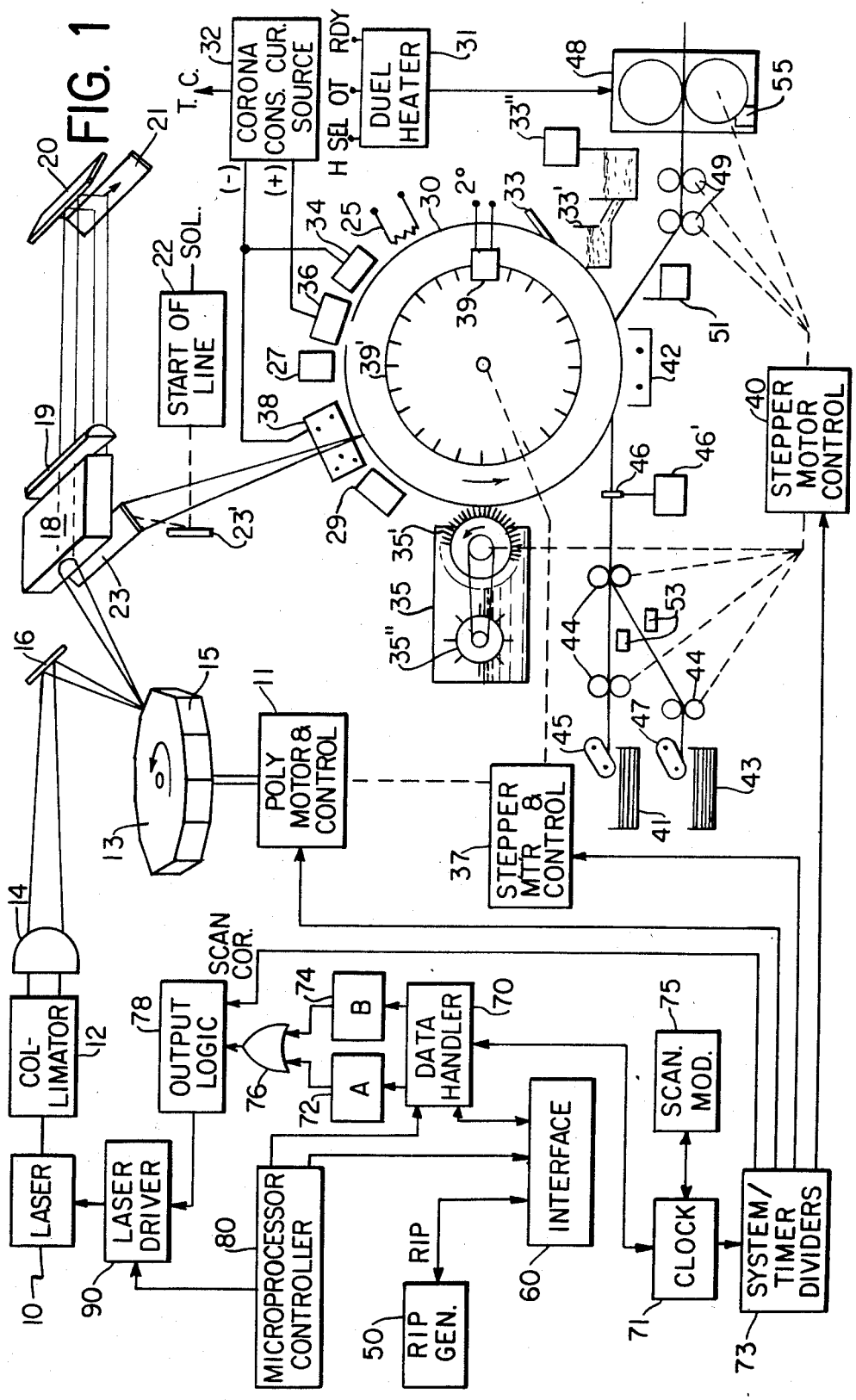
FIG. 1 is a block diagram of a laser printer according to the present invention.

In FIG. 1 there is shown a block diagram of a laser printer according to the present invention. This printer is used to make a copy on plain paper of an image created by a raster image processor (RIP) such as a high-speed digital phototypesetter 50. An example of such a device is the Monotype Lasercomp manufactured by Monotype Corporation, Ltd. of Salfords, Redhill, England as models MK2 and MK2i. However, the present invention can be adapted to print an image from any device capable of creating digital raster scan data directly or from a storage medium.

The present laser printer includes a laser diode 10 which is enabled at appropriate times by the system controller, i.e. microprocessor 80 acting through the laser driver circuit 90, and modulated by data derived from output logic circuit 78 and applied through laser driver 90. At the same time a system clock 71 has its output divided in timer/divider circuit 73 to produce a drive signal for a motor and control unit 11 that spins a polygon 13 that has reflecting facets 15. The polygon motor is a four pole hysterisis synchronous motor. Its control circuit is shown in FIG. 4A.

Figure 4A:
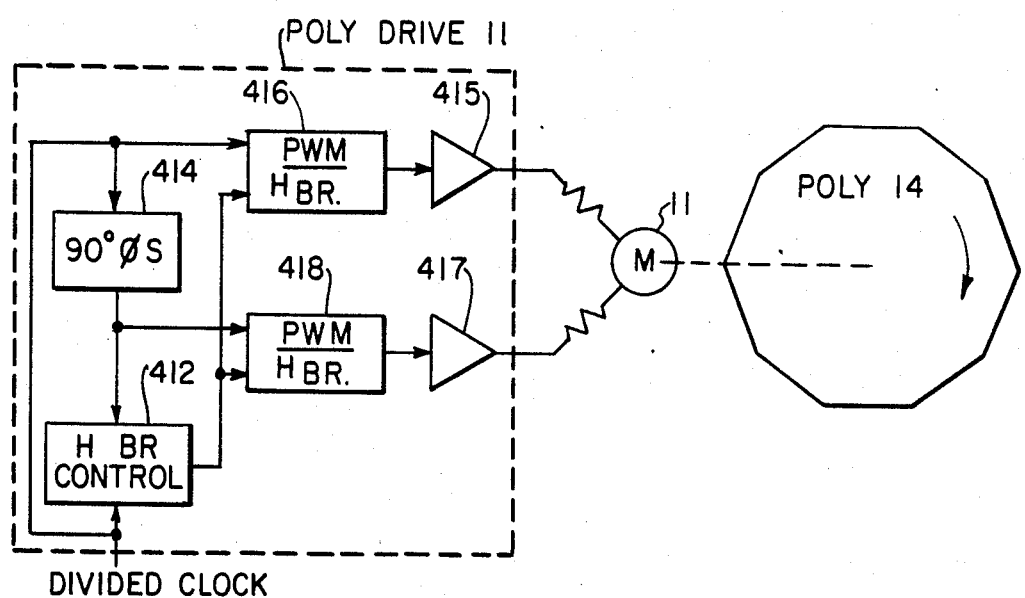

In FIG. 4A a divided clock signal from timer 73 is applied directly to an H-bridge control circuit 412, a 90° phase shift circuit 414 and a first pulse-width modulator - H bridge circuit 416. In addition, the output of phase-shift circuit 414 is applied to control 412, and to a second pulse-width modulator - H bridge circuit 418. The two modulator circuits 416,418 operate under control of circuit 412 and determine the direction of current flow. These modulator circuits in turn produce the drive signal for polygon motor 11 via power amplifiers 415, 417 whose output currents flow through the pole windings of motor 11 such as to cause it to rotate. In the present preferred embodiment, the polygon has (ten) 10 facets and rotates at about 6000 rpm.

With the laser being modulated and the polygon rotating, light passes through the optics. In particular, the light beam from the laser 10 passes through a collimator lens system 12 and a cylindrical lens 14 (FIG. 1). It is then reflected from a steering mirror 16 onto the rotating facets 15 of the polygon 13. Because of the rotation of the polygon, the reflected light sweeps across a scan lens assembly 18 and a second cylindrical lens 19. By means of fold mirrors 20, 21 and 23, the light is directed onto electrophotographic drum 30. However, a portion of the light beam from mirror 23, or an adjacent smaller "start-of-line" mirror 23', is directed to a start of line sensor 22. The sensor converts the light into an electrical signal ("SOL") which is supplied to microprocessor 80. The rate at which this sensor 22 generates SOL pulses in response to the sweep of the light beam is directly related to the polygon speed, i.e. once per facet. Consequently the SOL signal can be used by the microprocessor 80 to assure that the laser diode is on and the polygon is up to speed. Additionaly the SOL signal indicates the start of a scan line so it provides information on the physical position of the polygon.

The electrophotographic system utilized in the present design is generally referred to as the "Canon" or "Katsuragawa" process, but other processes, e.g. the "Xerox" Carlson process could also be used. The difference between the "Canon" process and the "Xerox" process is that the "Xerox" process involves imaging directly on a photoconductor, while the "Canon" process uses a dielectric layer over a rectifier-type photoconductor. Other types of photoconductors can be used, but the rectifier type, e.g. cadmium sulfide, is described in this embodiment. Both processes are available commercially and are described in the literature. Only the modifications described below are needed to adapt an electrophotographic process to practice the present invention.

In a typical "Canon" process the photoconductor may be located on a drum 30. The photoconductor is made of cadmium sulfide with a dielectric coating, typically Mylar. A drum heater 25 is used to improve the efficiency of the photoconductor-dielectric imaging medium prior to the start of operation.

During start up, the drum is also rotated to make sure it is clean before writing is commenced. This is achieved by flooding the entire photoconductor drum 30 with light from an erase lamp 27 while a second corona 38 is supplied with current from corona supply 32. The effect of this is to eliminate charge on the drum. This initial exposure is also a preparation step designed to "wake up" or sensitize the photoconductor.

Rotation of the drum 30 is by means of precision stepper motor and control 37. In particular, the drum motor is a 500 pole stepper motor with a gear reduction. Because of the large number of poles, accurate positioning of the drum, which maintains high resolution, is achieved.

The control circuit for the stepper motor is shown in FIG. 4B. This circuit contains five (5) current driver switches 430 which are operated in the proper sequence by a program stored in memory 432. A divided clock signal from timer/divider 73 is used to operate an address control circuit 434 for the memory 432. An input e from the microprocessor 80 via I/O decoder 242 (FIG. 2) can be directed to the address control in order to enable the address controller and bring it in sequence with the rest of the system. Because of the high number of poles, the drum motor operates smoothly and accurately to position the drum.

Once the system is ready, the microprocessor 80 supervises all control of the system. In the present invention, this microprocessor is really a state controller and does not really process data. As one of its first tasks, the microprocessor authorizes the interface circuit 60 to allow RIP data from Raster Image Processor 50 to be input to one of two memory circuits 72, 74. At an appropriate point in time after the start of the sweep of the laser beam across the drum 30, as indicated by the SOL signal, and related to the particular area on the drum where the information is to be written, the microprocessor allows data bits from one of the memory circuits to pass through OR-gate 76 and output logic 78 to laser driver circuit 90.

Figure 3:
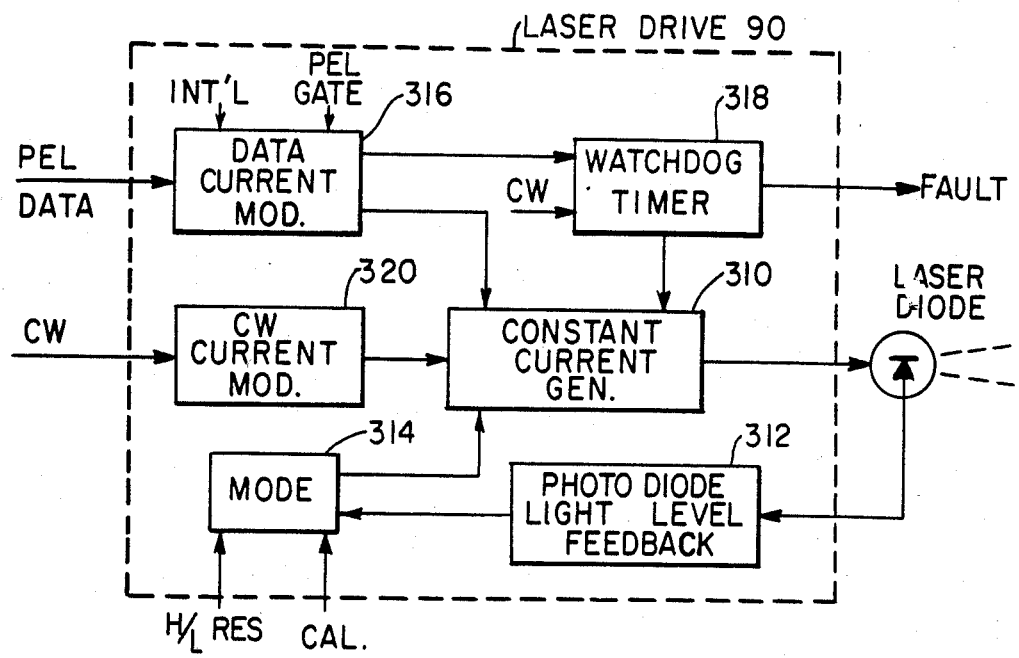
FIG. 3 is a schematic of the laser driver circuits.

Laser driver circuit 90 which is shown in detail in FIG. 3 receives the signal from circuit 78 and uses it to modulate the power to the laser diode, essentially turning the laser on and off as a function of the ones and zeroes of the data bits which relate to the spots or picture elements (pels) that will be imaged.

In the particular configuration illustrated, the printer writes the background, i.e. the laser is turned on for the white background areas on the copy and is off in the areas where there is an image. Thus, the laser light erases the background areas and leaves the black image areas behind. However the opposite system can also be used where the laser writes, or is on, in the areas needed for the image.

The modulated light beam coming out of the laser diode 10 described here has a unique characteristic. It diverges differently in two different directions and it is essentially coherent light. Since the light diverges differently in different directions, it is necessary to modify it to obtain an appropriately shaped and focused spot on the photoconductor. To accomplish this, collimator 12 is located after the diode (FIG. 1). The collimator has a lens design which gives the specific output spot that is desired. In particular the collimator 12 is a multiple lens system that reforms the spot in both directions into an essentially round beam with parallel rays.

Given the amount of distance available in the printer from the drum 30 to the collimator 12 and the desired focused spot size on the drum, it is possible to work backwards to determine the beam size required from the collimator. Further, the distance between the collimator 12 and the laser diode 10 can be adjusted to get that size output beam from the collimator for a given output spot size from the laser diode.

At the end of the collimator there is a cylindrical lens 14 which takes the round beam and focuses it in the vertical, i.e. cross scan or sagittal direction. This is done so that the vertical direction of the beam comes to essential focus very close to the facets of polygon 13. As a result the beam spreads over a larger area of the polygon facet than would a beam in focus on the facet. This tends to average out the adverse effects of facet surface imperfections. After the spot, which is now expanding in the vertical direction, leaves the polygon facet, it passes through scan lens assembly 18 and reaches a second cylindrical lens 19 placed at the end of the scan lens assembly 18. As a result, any of the manufacturing errors of the polygon in the vertical direction are essentially eliminated because the focused spot near the polygon face is reproduced in space in the same plane, even though it may have been high, or low on the polygon face, or reflected at a slightly varying tilt angle. This occurs because a reflected beam, even if it has been tilted or shifted because of the location or tilt variations of the polygon faces, will basically refocus a second time at an equivalent distance from the polygon if a second cylindrical lense is accurately positioned in the same plane as the first. Consequently, the need for a precision polygon can be reduced by using simple cylindrical lenses. This reduction in the polygon tolerances leads directly to a reduction in the cost of the polygon.

After the first cylindrical lens 14, the beam in the horizontal or scan direction is a collimated beam of a given size, not a focused beam as in the vertical direction. The size is specifically determined by the desired spot size when the beam is focused on the photoconductor drum 30 and can be determined by simple coherent optics analysis. The spot is made relatively large because in coherent optics, the larger the collimated beam the finer the spot it can be focused to.

In the present optical system there is incorporated a steering mirror 16 for alignment purposes. This is done so that the optical assembly after the collimator 12 can be removed as a unit and aligned. However, this mirror alignment is not required, it is just an advantage in terms of production. From mirror 16, the beam which is converging to focus in the vertical direction and collimated in the horizontal direction, strikes one of the moving facets 15 of polygon 13.

The reflecting facet of the polygon is not only moving, its distance from the steering mirror is changing during each sweep. However, this does not cause a problem because the beam is a collimated beam in the horizontal direction. In the vertical direction, this motion does have some effect because the focal distance is changing slightly. In particular the vertical size of the beam on the polygon is changing because of the changing distance from the focal point. This effect, however, is taken care of in the scan lens assembly 18.

As the beam sweeps across the scan lens assembly the scan lens performs two functions. One function is to focus the collimated beam in the horizontal direction down to a given spot size at the focal plane on the photoconductor drum 30 and to provide some focusing or collimating of the expanding beam in the vertical direction. Its second function is to flatten out the line of focus. Because of the sweep of the polygon the natural line of focus would be an arc. However, the photoconductor along the scan line is flat. Therefore, a correction is made by the scan lens assembly 18 to keep the spot in focus across the photoconductor. Therefore, the scan lens assembly is a field flattener and a focusing lens at the same time.

It is quite expensive to make a perfect field flattener, so this lens system does not give a perfectly flat focus line. Instead it produces a sinusoidal line of focus that is correct at the beginning and end of the scan line as well as at the two points which are one-third of the distance after the beginning and before the end of the scan line. As a result, the line of focus is a little above the photoconductor in the first and last thirds of the scan and a little below in the middle third of the scan. Nevertheless, the focus remains sharp enough across the scan to provide resolution in excess of 500 dots/inch.

The field flattening in the scan lens, which changes the line of focus from an arc to a substantially straight line, causes a sinusoidal variation in the velocity of the spot along the scan line. This variation is known as "scan velocity or speed" error. Such a scan velocity error can be corrected in the optics, but to do so is expensive. Rather than make a scan velocity correction, the system allows the optical variation and corrects for it electronically by changing the pel data rate.

Figure 2:
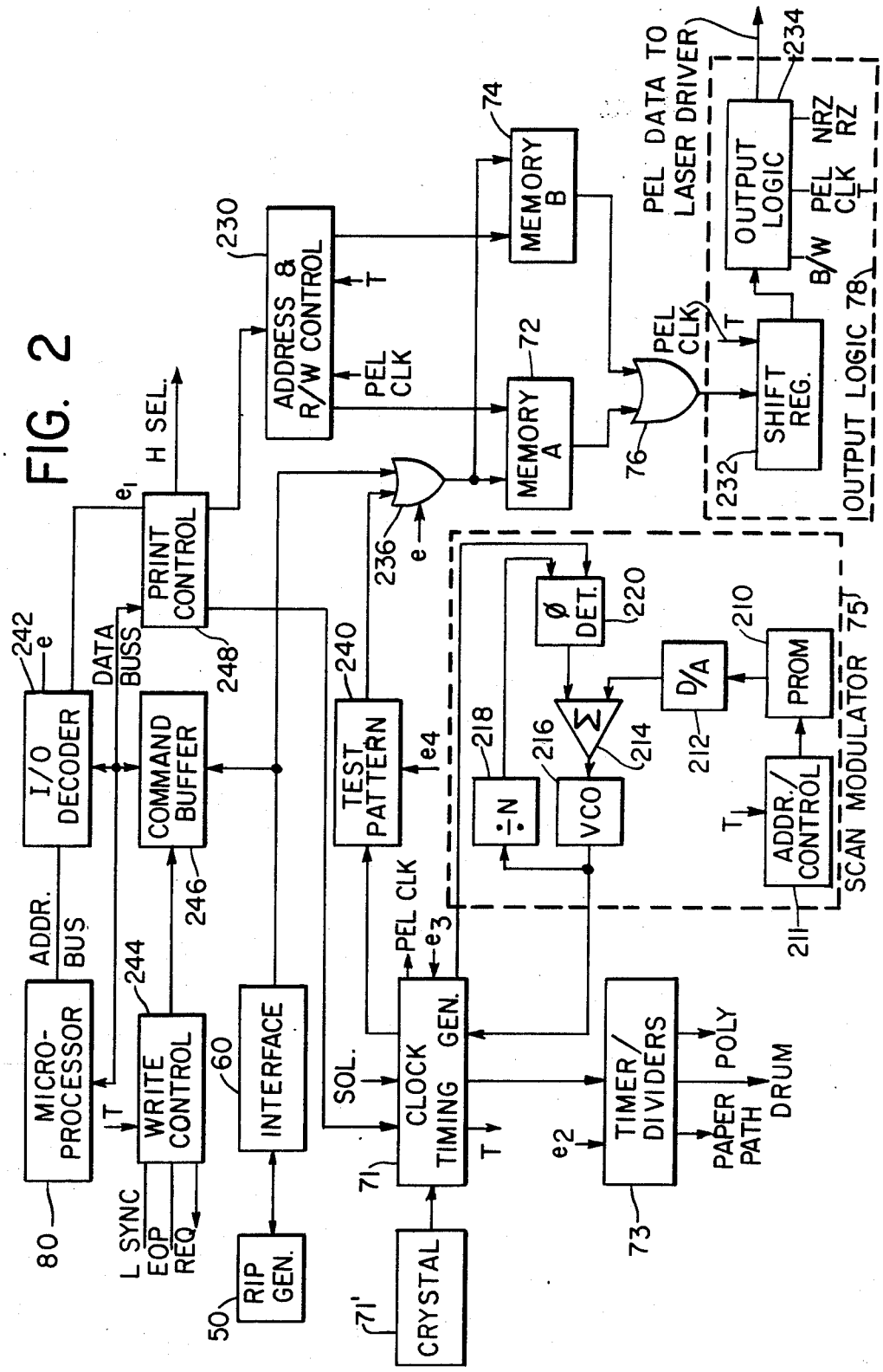
FIG. 2 is a schematic diagram of the scan speed correction and data handler circuits.

Since the scan velocity or speed error is constant, it is corrected by the scan modulator circuit 75 which varies the clock rate for sending data to the laser driver in a cosinusoidal pattern stored in a memory 210. The details of this circuit are shown in FIG. 2. Because of scan modulator 75, the data handler circuit clocks out the data from memories 72,74 to the laser driver at a rate that varies in direct opposition to the scan velocity error so that data is recorded on the photoconductor at what appears to be a constant velocity.

Within the scan lens assembly there is a beam which is being brought into focus in the horizontal or scan direction and somewhat refocused or collimated in the vertical direction. At the end of the scan lens assembly there is the second cylindrical lens 19 which principally refocuses the beam again in the vertical direction and in the same focal line as the focus in the horizontal direction. The rest of the optical system is basically a straight path down to the photoconductor drum 30. Folding mirrors 20, 21 and 23 along that route are merely used to fold the optical path so that the light can fit in a reasonably small package.

A part of the beam that comes off mirrors 23 or 23' hits the start-of-line sensor 22 (FIG. 1). Instead of using a mirror for this purpose, the start-of-line detector can be positioned next to mirror 23 so that it receives light directly from mirror 21. Whichever system is used, the light beam in striking the start-of-line detector 22, informs the system microprocessor of the scan beam position on the rotation of each facet of the polygon.

The start-of-line detector may be a single photodiode circuit or a more complicated, but more accurate circuit. In order to accurately detect the presence of the SOL signal, the output of the start-of-line sensor 22 is sampled at a very high clock rate. The rate is about eight (8) times the picture element (pel) clock rate so the system can determine the light beam position to much less than a picture element. Therefore, the location of the start of line is determined precisely and repetitively from line-to-line.

Once the start of line is found, the system counts off a programmable number of clock periods to determine where the start of data should be. This will be some location on the photoconductor and can vary from user to user, depending on where the user wants to start imaging on the drum.

As the scanning and modulated laser beam comes down onto the photoconduction drum 30, it passes inside or through a window in second corona 38. From this point on the raster light image created by the modulated and sweeping laser beam is developed into an image on paper by the electrophotographic process.

In the present example, a basic positive charge layer is put down on the dielectric layer by a first corona 36 as the drum 30 rotates. The charge could also be negative. Then the portion of the photoconductor with the charged dielectric over it is brought around under the opposite or negative polarity second corona 38. While the opposing charge is being generated, the photoconductor is imaged or exposed to the raster sweeping, modulated light beam. The result is that the second corona neutralizes some of the charge from the first corona. It does this even if there is no light, but not to the same extent.

Most corona systems have a high voltage supply that supplies either positive or negative voltage to the corona wire of from 5,000 to 12,000 volts, depending on the system. The supplies usually have some range of voltage over which they are adjustable by potentiometers. In the present system, however, the corona supply 32 is a constant current source, not a constant voltage supply. This current supply is of conventional design and merely monitors its own output to assure constant current, not the current in a sensor wire located under the corona unit. Nevertheless, it has been found that such a current supply maintains control over the number of ions generated in most environments.

As the atmospheric conditions change, for example, due to a change in humidity or atmospheric pressure, essentially the same number of ions are generated and system performance is not degraded.

When the light beam hits the drum under the second corona 38, the photoconductor layer underneath the dielectric becomes conductive. Consequently, charges move to try to neutralize the charge that is on the photoconductor layer. Therefore, in the dark areas the first charge is reduced to a certain level and in the light areas the charge is reduced to zero or even reversed. The result is a pattern of different voltage or charge levels on the surface of the dielectric which forms a latent electrostatic image.

Once the latent electrostatic image is formed on the dielectric under the second corona, there are also a lot of electrons and holes free in the photoconductor. To remove them, the entire area is exposed with light by post exposure lamp 29. This does not affect the charge on the surface of the dielectric, because there is nothing to address it; but, it does cause recombinations of the holes and electrons in the photoconductor. Additionally, it ensures that all of the photoconductor is active and establishes a higher differential in charge between the surface of the dielectric and ground.

The differential charge levels forming an image on the photoconductor dielectric surface are rotated past a magnetic brush developer 35 with a reservoir that holds a toner material mixed with a carrier material, which toner is attracted to the charge. Such two-component developer materials are commercially available. It is also possible to use monocomponent developer, i.e. where a magnetic toner is used alone.

Whatever developer is used, the material is attracted to a magnetic drum 35'. The shell of the drum is moved by motor and control unit 40. This causes the magnetic developer particles in the reservoir of the unit to form a brush-like tuft or covering on drum 35'. At the bottom edge of the reservoir there is, a doctor blade that blocks some of the particles and forms a uniform layer of material that is brushed against the photoconductor drum while moving in the opposite direction from the photoconductor drum. An auger wheel 35'' driven by the developer drum 35' assures that the developer mixture has a uniform consistency. When the layer of developer passes over the electrostatic image on the photoconductor drum, the toner is attracted to the positive areas left on the drum and is repulsed by the negative areas so that a toned or developed image remains on the dielectric.

As the toned image is moved around to a transfer corona 42, paper or to some other media, such as Mylar, is brought into the machine under the control of microprocessor 80 at the proper time in the rotation of the drum 30. To sense the drum position an optical encoder wheel 39' is located on the drum and a detector 39 produces output pulses at every 2° of rotation and a TOP or "top-of-page" signal for the position or positions on the drum where printing is to occur.

All motion along the paper path is controlled by motor and control unit 40 which drives the various elements. The motor 40 is a precision stepper motor so it essentially functions like a synchronous motor driven from the system clock. The circuit for driving the paper path motor is a sequential current driver and it is shown in FIG. 4C. This circuit is basically the same as the circuit for driving the drum motor shown in FIG. 4B. In particular, the windings of the 5-phase, precision stepper motor for the paper path are driven by circuit driver switches 440 according to a sequence for the 5 phases stored in memory 442. This memory is addressed by an address control circuit 444 that receives system clock impulses. Additionally, the address control circuit can be kept in synchronism with the rest of the system by an enable input e.

Since the motor drives for the drum and paper path are similar and are driven by a divided signal from the system clock, the paper can be made to move at approximately the same rate or linear speed that the photoconductor drum is moved, e.g. about 0.6 inches per second in the high resolution mode, i.e. at the low speed. The speed can be increased and the information rate decreased to achieve the low resolution in high speed mode.

At an appropriate point in the rotation of the drum, e.g. approximately 64 degrees from the TOP or zero reference, as determined by the 2° pulse outputs from detector 39, the laser beam writes data on the drum. In this system it is written such that the beam is on where white is to appear in the final copy, i.e. the beam is discharging the photoconductor to wipe out all the unnecessary information. While this is happening the paper in either an upper paper tray 41 or a lower tray 43 is caused to enter the machine. This is achieved by energizing either escapement 45 or 47 which take the paper from the appropriate tray and put it into the feed track. Typically, different size paper is used in the trays and the tray which is to be used is selected by the operator.

The paper moves along this track under the influence of rollers 44 driven by a chain attached to motor 40 until it comes to a gate 46. The gate holds the paper there and does some alignment of the paper to eliminate skew because the gate is a flat parallel plate and the driving rollers are moving so as to keep the paper pushed against the gate. At the correct angle (time) for assuring a transfer of the toned image on the photoconductor drum to the paper, a solenoid 46' attached to gate 46 removes the gate and allows the paper to continue moving along the paper path. The paper and the toned image on the drum thus come together at the correct location. At that point, the charge on the drum takes over and pulls the paper to it so that the drum now controls movement of the paper.

The next significant point occurs when the paper passes under transfer corona 42 which acts to transfer the toned image to paper. This transfer corona is turned on at the appropriate point in the cycle to assure total transfer of the image. Under this corona the toner is transferred to the paper and the paper keeps on moving.

As the photoconductor drum rotates and the paper passes the transfer corona, the paper must be removed from the drum. In this particular system, there is a piece of tape at one edge of the drum such that the edge of the paper never directly contacts the drum. The tape leads that edge of the paper into rollers 49 located just beyond the transfer corona. When the paper comes to the other side of the transfer corona, the charges holding the paper to the drum have been fairly well eliminated so the rest of the paper can be easily peel from the drum.

Beyond rollers 49 the paper is picked up by the rollers of fuser 48. These rollers extend across the entire width of the paper and pull it away from the drum. Also these rollers use heat and pressure to cause the toner to deform, melt and adhere to the paper. Then the paper with the image on it comes out of the system.

The machine can run at various speed and resolution combinations. Consequently, the fuser heater 31 must be able to vary the temperature to the fuser under program control so that fusing can occur properly at different speeds. The fuser is made up of silicone, urethane or teflon coated rollers which are maintained under a certain level of spring pressure to squeeze the toner into the paper as it is being heated.

A wick 55 containing silicone oil may be used for wiping the lower roller with oil. Between printing stages some of the silicone oil on the bottom roller transfers to the upper roller. This oiling of the fuser rollers is done to keep them smooth and clean so no toner is transferred to them from the paper. A transfer of toner to these rollers could cause jams, adherences and so on. There is also a scraper in the fuser that scrapes off any toner that may stick to the upper roller despite the oil.

Prior to the rollers 49 there is positioned a separation sensor 51. The sensor 51 detects when the paper properly separates from the drum. There are also paper jam detectors 53 located along the paper path before the drum. The signals from these sensors are used by the microprocessor in a conventional fashion to assure that the system is operating properly. If these sensors detect a paper jam, the system will go into an immediate shut down. For other less critical system faults the system will go into a delayed or orderly shut down.

As the drum comes around after the paper has been peeled off, there may still be residual toner on it. To eliminate this toner for the next image, a scraper blade 33 is used. This blade, which preferably is made of urethane, but could be made of other materials, scrapes the toner off the surface of the Mylar dielectric and drops it into a well 33'. There is an auger in the well which keeps driving the waste toner forward so that it falls out of a hole in the well into a waste toner bottle. Attached to the bottle is a replenishment sensor 33" which indicates whether the waste toner bottle has been replaced. There is a control in the machine that requires that after a certain number of copies the waste toner bottle be replaced. The machine counts the number of copies and requires replacement of the bottle when the number is exceeded. The sensor determines if the bottle has been replaced with a new bottle when this count is exceeded. If the bottle is not replaced, the machine goes into a delayed shut down and stays that way until the bottle is replaced.

After the scraper blade 33, the drum comes under a DC corona 34 which tends to neutralize any surface charge that is left. Some of this charge may be due to some electrostatic interaction between the blade and the dielectric.

Referring to FIG. 2, there is shown the data handler circuit 70 and the system clocks and timing. The main clock is generated by a crystal 71' and its output goes through clock timing generator 71 to timer/divider circuit 73 where it is divided down in many ways. These divided clock signals are used to control the system motors, i.e. the motors for the paper path, drum and polygon.

The scan modulator 75 is used to clock the pel data because the optical system does not move the beam at a uniform velocity across the drum. In effect the scan modulator compensates for this by creating a clock signal for reading out the pel data which is offset in time according to data stored in the PROM 210.

To obtain this pel clock signal a divided clock signal from circuit 71 is compared in a phase comparator 220 with the output of a VCO 216 after it has been divided in divider circuit 218. The error signal from this comparison is then fed through summing circuit 214 to the VCO so it will be locked to the divided crystal frequeny. However, to vary this frequency in a cosinusoidal manner to compensate for scan speed error, a correction signal from digital-to-analog converter 212 is summed in circuit 214 with the phase error signal. The input needed for the correction is stored in PROM 210 whose contents are addressed by address controller 211. In turn, address controller 211 is driven by the system clock so that for each clock pulse there is a new correction signal and a continuous frequency modulation of the clock rate occurs across each scan. In order to reset this circuit and others at the beginning of each scan line, the SOL signal is applied to clock circuit 71 and the pel clock signal is taken from that circuit.

The pel clock is applied to address read/write control 230. This circuit which is actually controlled by the microprocessor, reads data into shift register 232 from the appropriate memory A or B at the varying pel clock rate. In the meantime, control circuit 230 is causing RIP data from interface 60 to be fed through OR-gate 236 to the other memory. Instead of actual data, test data from test pattern generator 240 can be passed through gate 236 to one of memories 72, 74. The test signals from test pattern generator 240 are created from a timing signal produced in clock generator 71.

Memory data, whether it be the test pattern information or actual raster data, is read out of the appropriate memory through OR-gate 76 to shift register 22 of output logic 78. The data can then be shifted from this circuit at the pel clock rate or at a division of the system clock rate. From the shift register the data is applied to output logic circuit 234 that prepares it for the laser driver. This may be done by inverting the data bits of the system to write the image areas, i.e. write black rather than erase the background areas, i.e. write white. Also, the signal may be changed from return-to-zero format to non return-to-zero as needed for the laser driver.

As shown in FIG. 2, the microprocessor 80 that controls the printer has an address bus and a data bus. Over these lines an input/output decoder 242 is instucted to generate enable pulses e that synchronize the operations of various parts of the system, e.g. gate 236, generator 71 and stepper motor address control circuits 434, 444. In addition, the interface 60 is informed by the microprocessor 80 when the system is ready to receive data and other instructions over a command buffer 246. The buffer 246 also receives information on line sync and end-of-page via write control circuit 244 and supplies it to the microprocessor. Information on the resolution speed mode selected by the user is transmitted to the rest of the system from the microprocessor via print control circuit 248. For example, the output of circuit 248 is delivered to the fuser heater control to set its level. The user also sends information to the microprocessor on the size of the paper, resolution, paper tray and other user selected information through command buffer 246.

The laser driver circuit shown in FIG. 3 modulates the current to the laser 10 and effectively turns the laser on and off. Current from a constant current source 310 determines the maximum current permitted to go through the laser. The laser is a laser diode with a built in photodiode that monitors the laser light output and provides feedback. Thus, there is a feedback circuit 312 that maintains constant light output.

To prevent the diode from blowing out, the driver circuit makes sure that the current is limited within a certain specified range. In addition, there is a calibration circuit 320 which keeps the laser on continuously prior to start-of-line or page. Therefore, at the appropriate time in the polygon synchronization cycle, the data drive operation is aborted and the laser is turned on fully with no modulation occurring on the diode. This selection is made under program control by applying the CW signal to circuits 318 and 320.

The pel data is applied, to the data current modulator circuit 316 along with interlock and pel gate signals.

The data current modulator 316 delivers a signal to a watchdog timer 318. The watchdog timer makes sure that the laser driver is running properly. Since it is harmful for the laser to stay on continuously or at too high a current for too long, the watchdog timer monitors the data current modulator 316 and automatically shuts off the current generator 310, and therefor the diode, if safe operating conditions are exceeded.

As previously noted, the printer can operate in either a high or low resolution mode and this is under program control. One output of the program is a H/L Res, i.e. high-low resolution signal, which is supplied both to the mode circuit 314 and the current modulator 316. The current level or the power output of the laser diode thus is changed as a function of whether the system is running at low resolution i.e. under 400 dots/inch, or high resolution, i.e. more than 500 dots/inch. Less laser power is needed at high resolution since more dots are packed into the same area. The mode circuit 314 also has a "CAL" or calibration input which is compared to the photodiode feedback level and used to bring the diode up to the right level based on the feedback from the photodiode as well as the H/L Res mode.

Figure 5A:
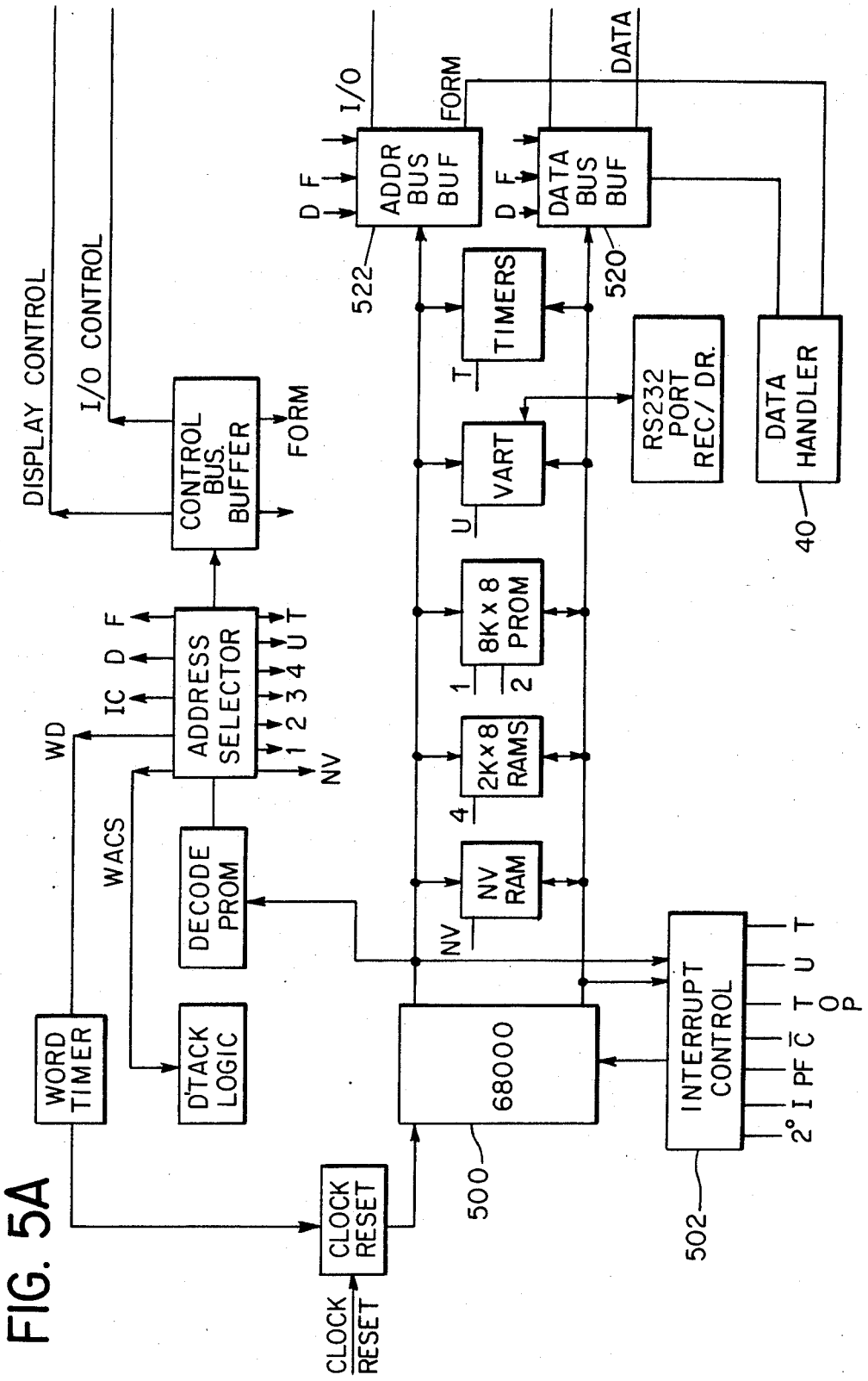
FIGS. 5A and 5B are a schematic diagram of the microprocessor that controls the overal operation of the system.
Figure 5B:
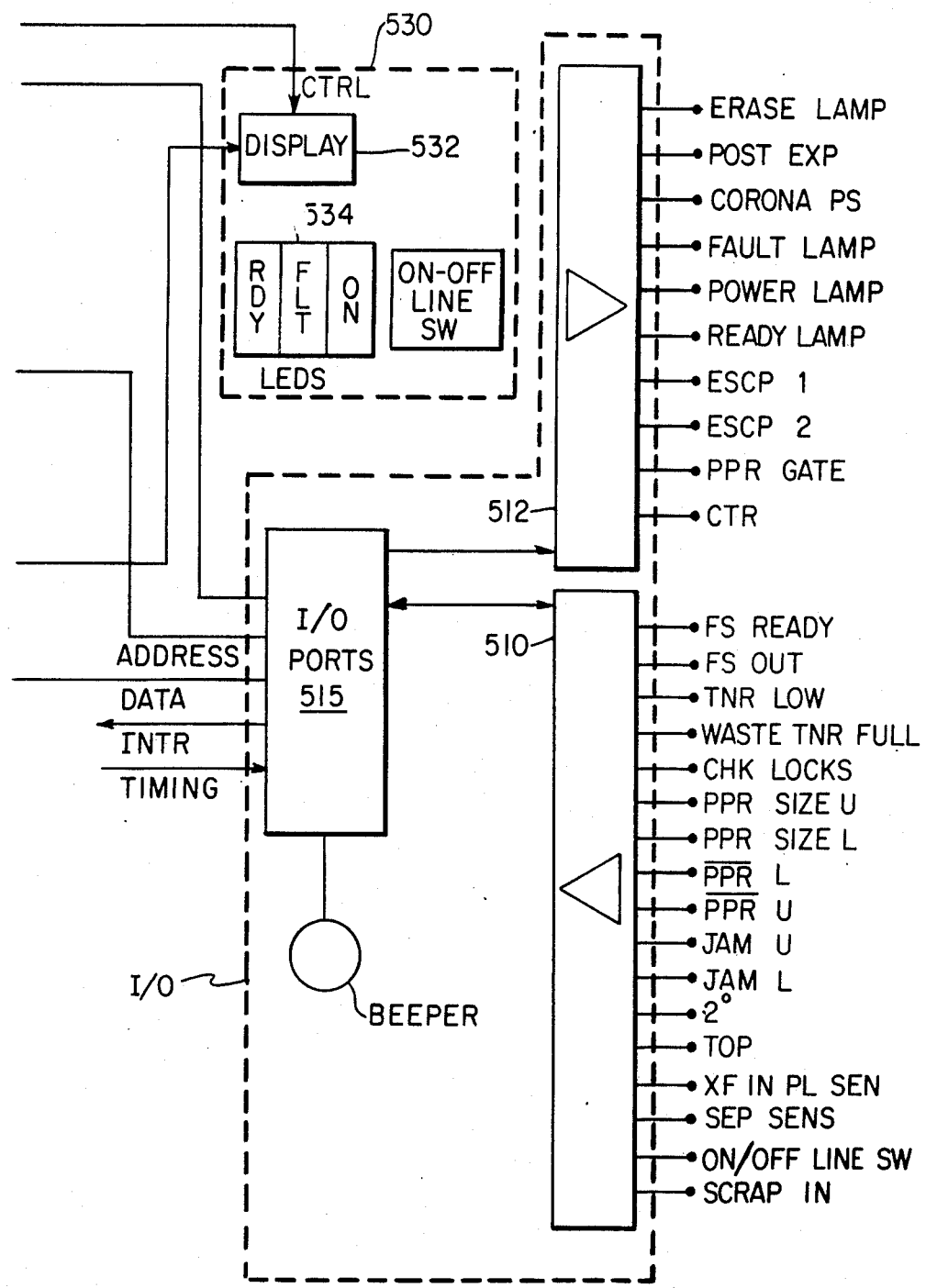

FIGS. 5A and 5B show the general arrangement of the system control, which is basically a Motorola 68000 microprocessor 500 programmed to operate as a state machine according to instructions supplied by the manufacturer. The microprocessor controls the whole operation of the system. It has a clock input which comes from crystal 71'. The processor also has RAMS and PROMS as memory units. Further, it includes a UART, i.e. a universal asynchronour receiver transmitter device used for putting serial data in an RS232 format. These units are connected together by an address bus, a data bus and a control bus.

In operation the processor 500 utilizes interrupt control 502, i.e. there are numerous signals directed to the processor which interrupt it to tell the processor that the system is at a particular point and requires instructions. One such signal is the 2° signal from the drum encoder. Every 2° it requires that the processor check to see whether there is something to do. Another signal is the "top of the page" or TOP signal which is the zero reference on the encoder 39' attached to the drum. There are a whole series of such signals that indicate that the fuser is ready, the toner is low, the toner bottle is to be replaced, etc. There are also interlocks such as door switches, scrapers blade position, tray in place, etc. Further, there are jam detectors 53 that tell if the paper is at a certain point at a certain time, and a separation sensor 51 that tells if the paper has separated from the drum. The various signals come from different parts of the machine and interrupt the processor to ask for further instructions or to indicate status. These signals reach the processor through input buffers 510, 512 and I/O port 515 (FIG. 5B). The interrupts go directly to circuit 502, but the other data received is applied to the processor through data bus buffer 520.

The microprocessor, by knowing where the system is at a particular time, knows when to do certain things. This information is delivered over data bus buffer 520 and address bus buffer 522 to the I/O port 515 and from there to the system through output buffers 512. For instance, the processor, over the appropriate output port and at the appropriate time, will turn on the post exposure lamp by applying a signal over buffer 512 to turn on the power supply for that lamp.

The laser printer also has a display 530 to aid operator use. The data bus comes out to a 16-character liquid crystal display 532 and some LED's 534 which are the operator interface. As a result, the status of the system, e.g. system ready, paper jam, etc. can be displayed for the operator.

Figure 6B:
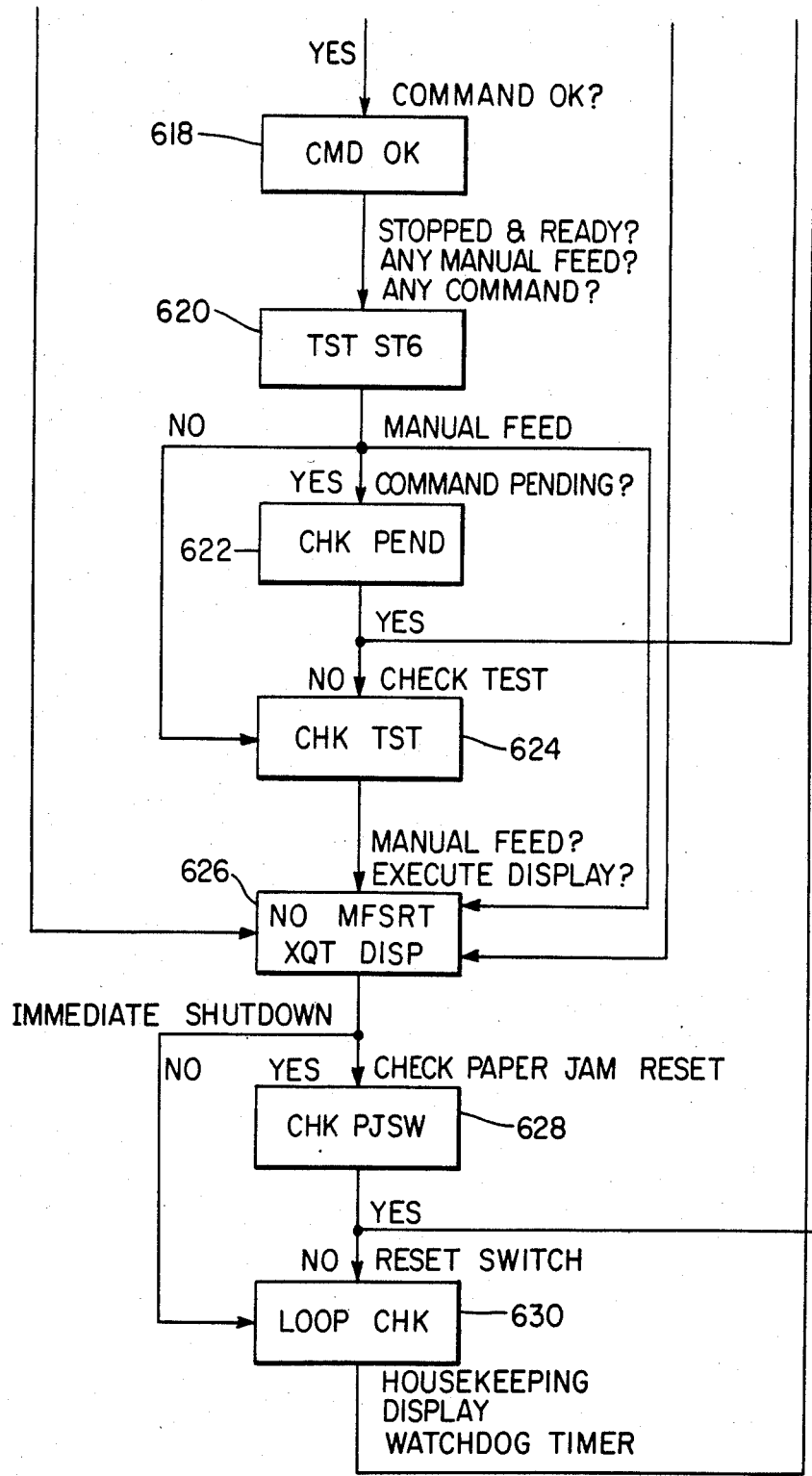

In FIGS. 6A and 6B, there is shown a flow chart of the executive routine for the microprocessor which controls the operation of the laser printer. This routine is interrupt driven so as to cause it to branch to certain simple subroutines that handle individual system operations.

At the beginning of the program, the entire system is initialized in the EXEC state 600. When this is complete, the program moves on to XEC LOOP 602. In this loop, the program first checks to see if there is a 2° interrupt. If not, the program moves immediately to state 604 where it checks for an immediate shut down condition due to a paper jam. If in state 602 a 2° interrupt is found, the program checks for critical action points.

Critical action points are degrees of rotation of the drum where action must be taken to continue the operation. A table is prepared which corresponds degrees of rotation of the drum with various states of the machine and provides particular action that must be taken. Thus, the system has a great deal of flexibility in that by changing the critical action points or the microprocesor's response to those action points, the operation of the machine can be varied. A typical critical action point is the 64° point in the rotation of the drum when printing with the laser is to occur, provided the system is in a normal ready condition.

After the critical action point is checked and any required action is taken, the system then checks for possible jams by checking paper jam sensors 53 as it normally does when there is no 2° interrupt. Following this, the check for immediate shut down in state 604 is made.

If a flag is set indicating that immediate shut down should take place, the program branches to state 605 which executes the immediate shut down procedure. If no immediate shut down is found, the program proceeds to test for manual feed roller use in state 606. This part of the program allows a user to input paper of a size different than that included in the paper trays. Thus, it requires activation of the feed rollers without activation of the escapements 45, 47.

After the manual feed roller check, the program checks to see if there is a fault in the toner supply. If there is, the program moves from state 608 into state 610 which sets a flag. This allows the system to continue to produce a limited number of additional copies, even though there is an indication that the system is out of toner. If no toner fault is detected, the system skips over section 610 to state 612 of the program which checks the rest of the faults.

Once a flag has been set in state 610, and after the preset number of copies have been made, the program branches to state 611 which executes a delayed shut down. This differs from immediate shut down in that there is no need to rapidly remove power from parts of the system in this state. If the flag is not set, the program drops into state 612 where the other faults are checked.

If one of the faults checked in state 612 indicates then an immediate shut down is required for other than a paper jam which was checked in state 604, the program will branch to state 605 and execute the immediate shut down. Such a fault might include an overheated motor. In state 612, delayed shut down situations, such as loss of laser power, are checked and if one of them occurs the program branches to state 611 to execute the delayed shut down.

If no faults are detected, the program branches to state 616. If there is a fault in state 612, but it is not an immediate shut down or delayed shut down fault, the program enters state 614 where a check is made to see if paper is available. The program will continue to loop between states 614 and 612 until paper is provided. Then the program will pass on to state 616.

In state 616, the program checks to see if a command error fault has occurred or if there is no valid command pending. It also checks the state of the machine. If no command is available, the program branches to execute a delayed shut down in state 611. If a command is available, the program moves to state 618 to see if the command is valid.

In state 619, a check is made to see if the system is in the test mode and then the program passes to state 620 where a test is made to see if the printer is in machine state 6. Machine state 6 is the stopped and ready for command mode. In this position, the program inquires whether there are any manual feed commands or test mode commands. If there are no pending commands and no manual feed, the program branches to state 624. If there is manual feed command, the system branches to state 626. Otherwise, the program falls through to state 622 where a check is made for a pending command. If such a pending command is available, the program loops back to test for manual feed roller use in state 606. Otherwise, it passes through state 624 where the system checks to determine if it is still in the test mode.

After the check in state 624, the program passes to state 626 where the front panel display routine is executed to deliver information to the user and the manual feed roller is checked again. Finally, a check is made to see if there is a requirement for an immediate shut down. If there is no immediate shut down condition, the program branches to state 630. If there is a requirement for immediate shut down, a check is made to determine if this is due to a paper jam, whether the paper jam has been cleared and whether the paper jam reset button has been pushed. If the reset button has been pushed, the program branches from state 628 back to state 600. If the button has not been pushed, the program falls into state 630 where the loop check is carried out.

In loop check, housekeeping duties are taken care of, including updating the display and sending signals to the watchdog timer of the laser timer to keep it from shutting down the system.

The operation of the executive routine shown in the flow charts of FIGS. 6A and 6B, in combination with a critical point table, cause operation in the manner desired by the user. The details of programs for carrying out this flow chart will depend on the particular program, microprocessor or logic system used.

The details of the optical system are shown in FIG. 7A for the horizontal or scan direction and FIG. 7B for the vertical or sagittal direction. The light from laser diode 10 passes through an aperture 710 into collimator 12. In the collimator the light first passes through a spherical concave-convex lens 712 and then through a doublet 714 comprised of double concave and double convex lenses. At the exit of the collimator there is a plano-convex lens.

From the collimator 12 the laser light passes through cylindrical lens 14. As can be seen from FIGS. 7A and 7B the collimator essentially changes the diverging light from laser diode 10 into parallel rays. These rays can form a circular spot or the light beam can have different diameters in the horizontal and vertical direction as in FIG. 7.

The cylindrical lens 14 has no effect in the horizontal plane as shown by FIG. 7A. However in the vertical plane the output of collimator 12 is focused by cylindrical lens 14 at a point prior to the polygon facet.

In the horizontad direction the collimated beam is caused to sweep by the polygon, but it has no effect on the expanding beam in the vertical direction. This sweeping beam enters scan lens assembly 18 which includes two spherical concave-convex lenses 720, 722, followed by a doublet 724 comprising a double concave with a double convex lens. This lens assembly focuses the beam in the scan direction on to the photoconductor 30 and generally collimates it in the vertical direciton.

At the end of the scan lens assembly there is the cylindrical lens 19 that focuses the beam in the vertical direction onto the photoconductor drum 30.

While the present invention has been particularly shown and described with reference to a preferred embodiment thereof, it will be understood by those skilled in the art that various changes in form and details may be made therein without departing from the spirit and scope of the invention.

We claim

1. A high resolution laser printer comprising:
   photosensitive medium;
   laser means for generating a modulated beam of laser light;
   at least one moving mirror surface located in the path of said light beam and reflecting the beam such that it sweeps across said medium;
   an optical collimator means located between said laser means and said mirror surface for forming the modulated laser light into a substantially collimated beam;
   first cylindrical lens means located between said collimator means and said mirror surface for focusing the light output of said collimator means in the sagittal or cross-scan direction at a position near, but not on, said mirror surface;
   a scan lens assembly positioned between said mirror surface and said medium for focusing the reflected light in the horizontal or scan direction such that it is in focus along a substantially straight line across said medium; and
   a second cylindrical lens positioned between said scan lens assembly and said medium for focusing said beam in the sagittal direction along said medium.

2. A laser printer system as claimed in claim 1 wherein the moving mirror surface is formed as a facet of a multi-faceted rotating polygon.

3. A laser printer system as claimed in claim 1 wherein said collimator comprises in series a spherical concave-convex lens, a doublet including double concave and double convex lenses, and a plano-convex lens.

4. A laser printer system as claimed in claim 1 wherein said scan lens assembly comprises in series two spherical concave-convex lenses and a doublet including double concave and double convex lenses.

5. A high resolution laser printer system comprising:

laser beam generating means for generating an information modulated laser beam;

optical means for causing said laser beam to come into focus at a recording medium sensitive to said laser beam, said optical means including a field flattener;

sweep means for causing said laser beam to sweep across said recording medium;

a photosensitive means for detecting the start of sweep of said laser beam across said recording medium; and correcting means for varying the rate of modulation of said laser beam as it sweeps across said medium to compensate for variations in the optical velocity of said beam across said medium due to said field flattener, said correcting means including memory means for storing correction data sufficient to create a continuously varying correction signal during a sweep, which correction signal is opposite to the optical velocity variations, and means for using the correction data stored in the memory to vary the rate at which modulation information is applied to said laser beam generating means during a sweep.

6. A laser printer systems as claimed in claim 5 wherein the medium is a photoconductor and further including:

means for creating an electrostatic charge image on said photoconductor;

means for developing said image; and means for transferring said developed image to plain paper, said means for creating an electrostatic image including at least one corona generator powered by a constant current power supply which senses and regulates only its own output current.

7. A laser printer system as claimed in claim 1 wherein the medium is a photoconductor and further including means for creating an electrostatic charge image on said photoconductor, including at least one corona generator powered by a constant current power supply that senses only its own output current.

8. A laser printer system as claimed in claim 7 wherein the moving mirror surface is a facet of a multi-faceted rotating polygon driven by a first stepper motor, said photoconductor is mounted on a drum rotated by a second stepper motor having hundreds of poles, and further including:

means for developing said image;

means for transferring said developed image to plain paper;

means for moving said paper along a paper path into contact with said photoconductor, said means for moving said paper including a third stepper motor having hundreds of poles; and system clock means for providing synchronized drive signals to said first, second and third stepper motors.

9. A laser printer system as claimed in claim 1 wherein said laser means comprises:

a laser diode;

a current modulator that drives said laser diode on and off with current pulses related to the information, a photodiode means for receiving light from said laser diode and generating a feedback signal, means for comparing the feedback signal when the laser is on to a reference level, and generating a control signal in response thereto, means for controlling the on current to the laser in relation to said control signal, and means for varying the reference level depending on the selected laser light output.

10. A laser printer system as claimed in claim 8 further including a computer controller means for controlling the operation of the printer system.

* * * * *